Sept. 21, 1965  E. B. ARCHER  3,206,940
AUTOMATIC ICE CUBE MAKING APPARATUS
Filed Oct. 22, 1963  7 Sheets-Sheet 1
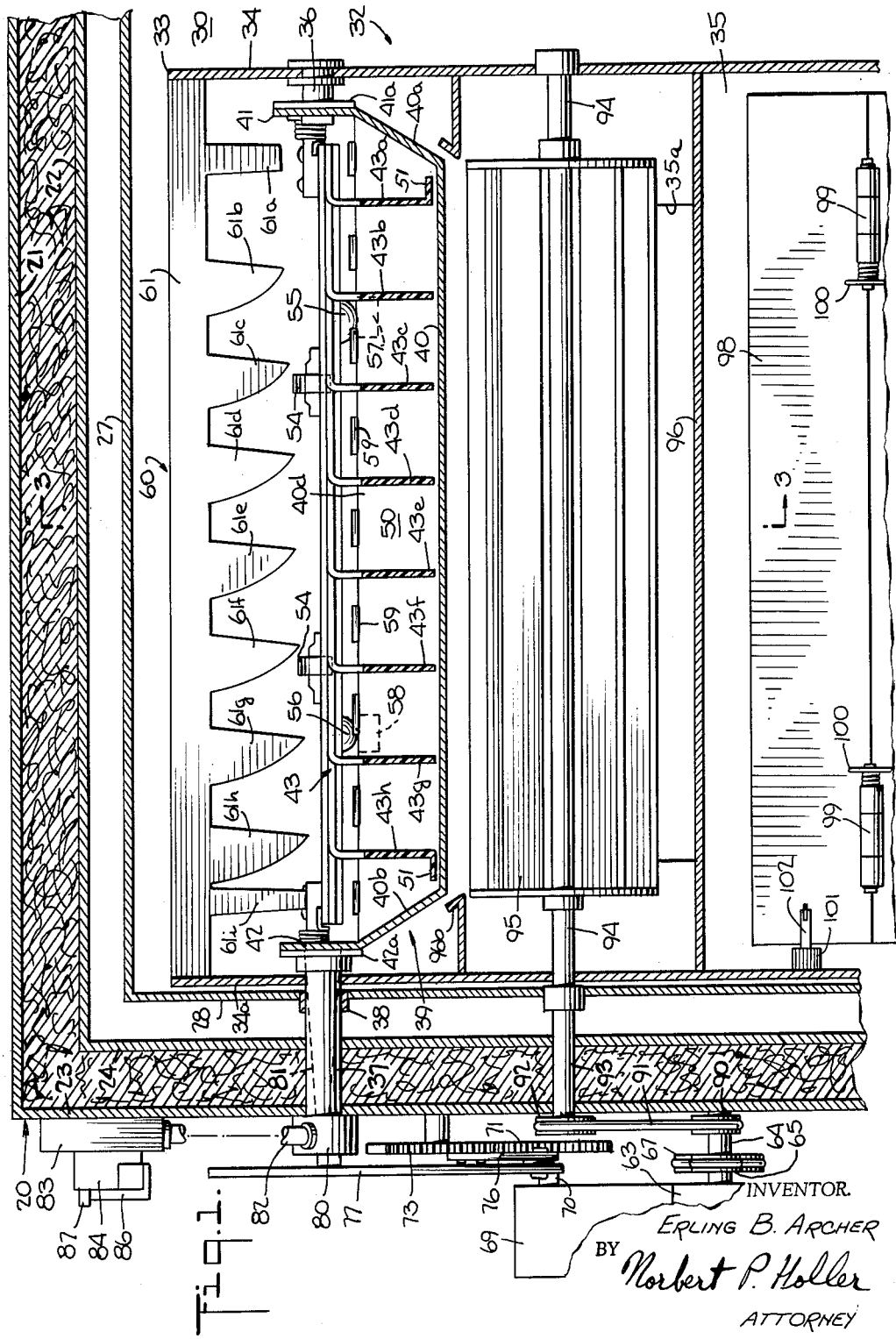
INVENTOR.
ERLING B. ARCHER
BY Norbert P. Holler
ATTORNEY

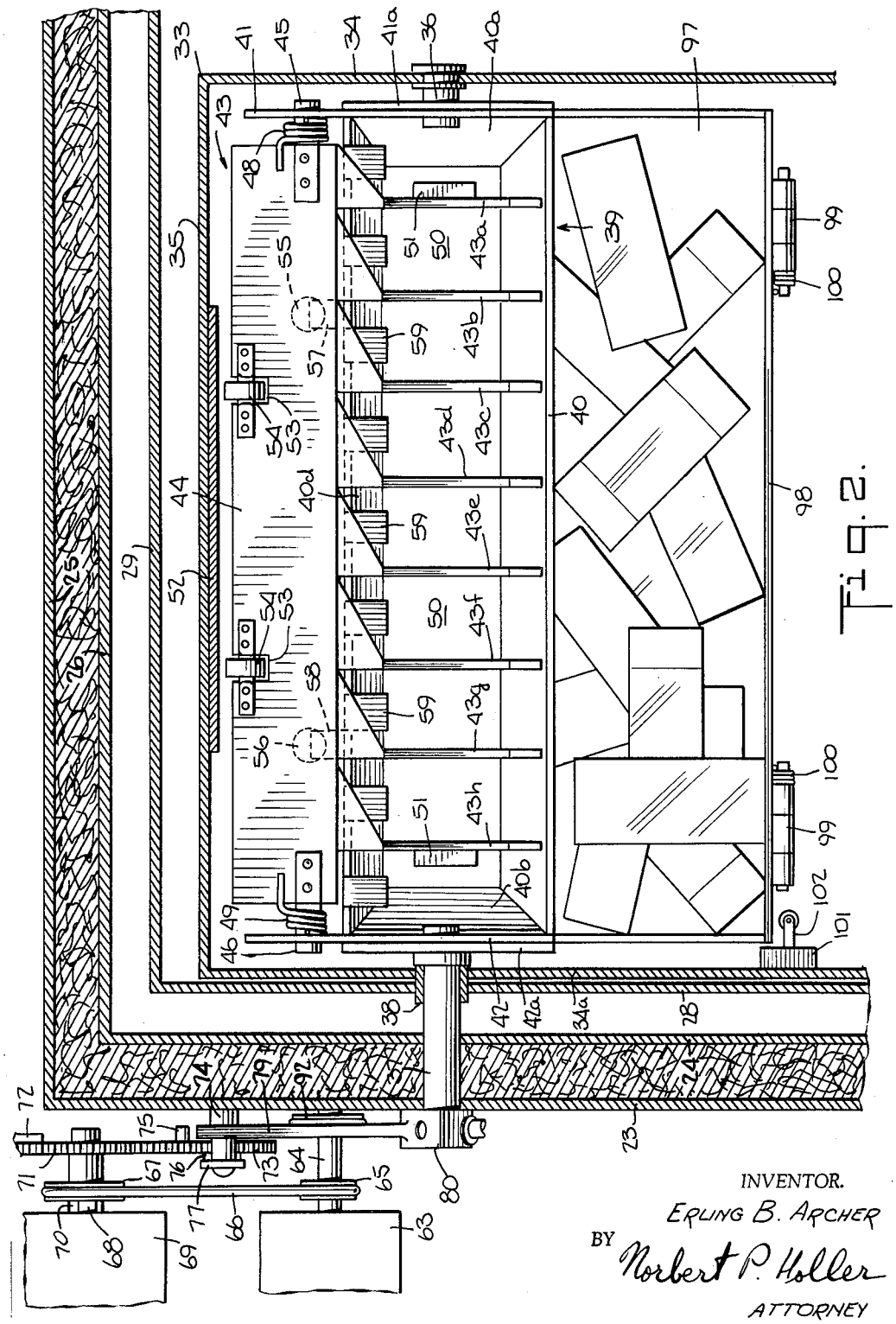

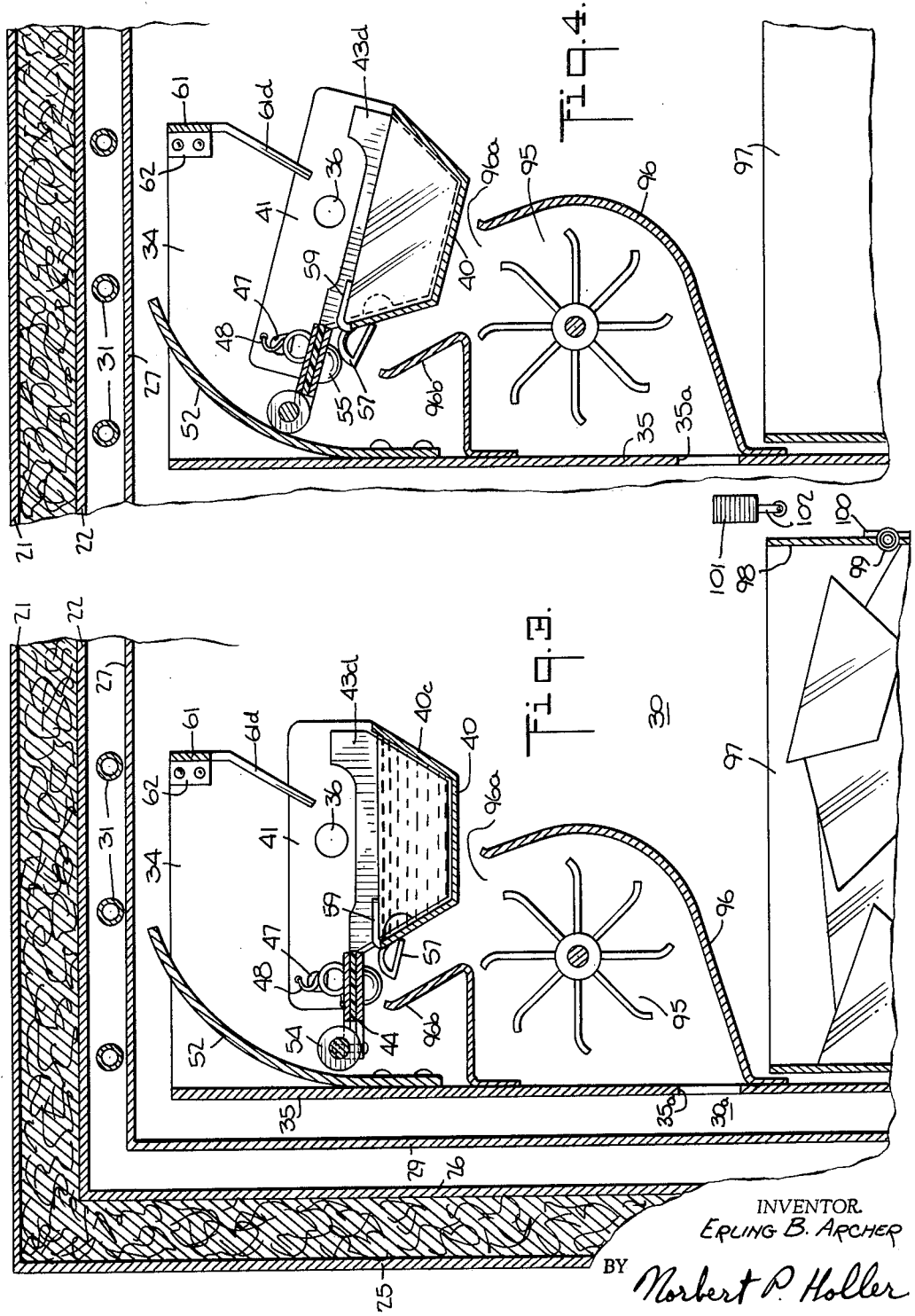

Sept. 21, 1965   E. B. ARCHER   3,206,940
AUTOMATIC ICE CUBE MAKING APPARATUS
Filed Oct. 22, 1963   7 Sheets-Sheet 4

INVENTOR.
ERLING B. ARCHER
BY Norbert P. Holler
ATTORNEY

Sept. 21, 1965  E. B. ARCHER  3,206,940
AUTOMATIC ICE CUBE MAKING APPARATUS
Filed Oct. 22, 1963  7 Sheets-Sheet 5
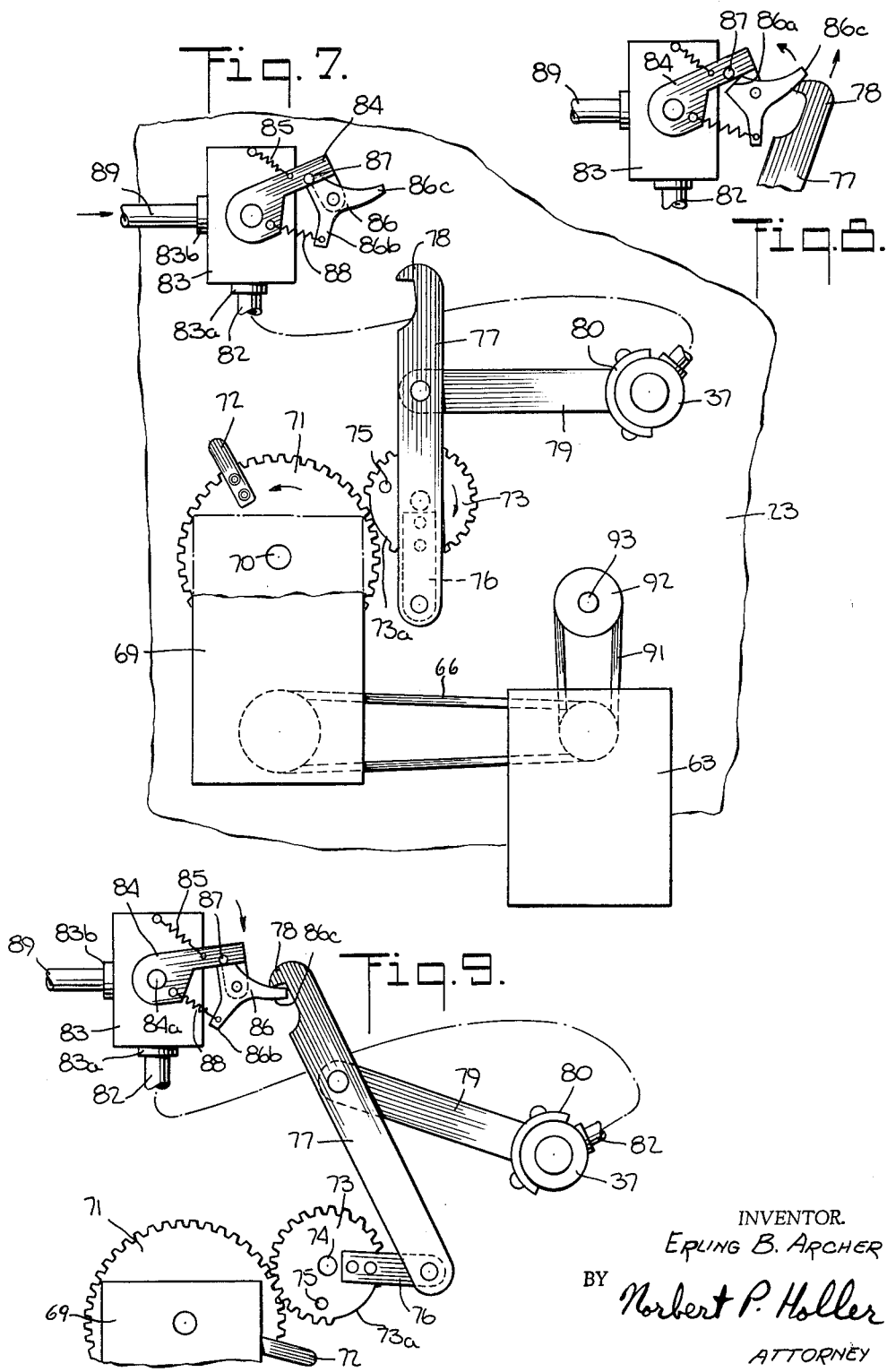
INVENTOR.
ERLING B. ARCHER
BY Norbert P. Holler
ATTORNEY

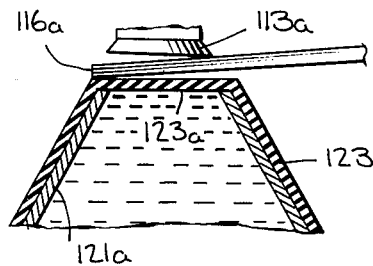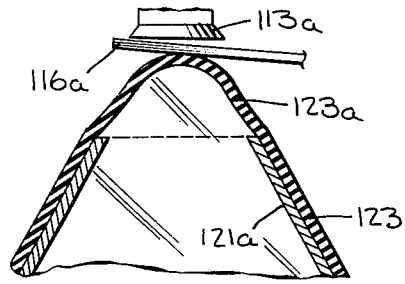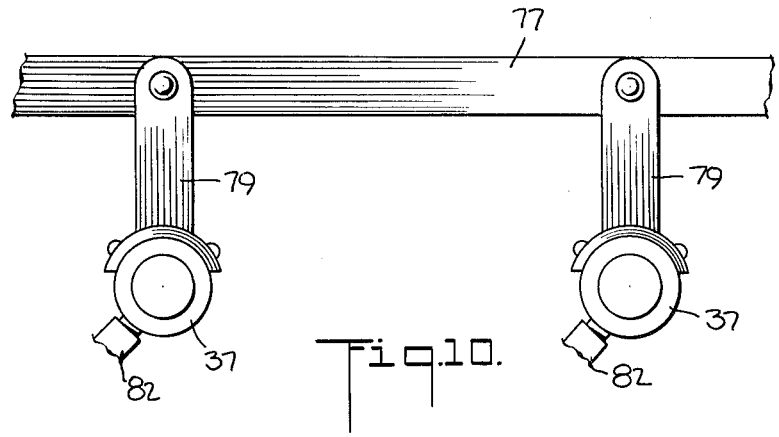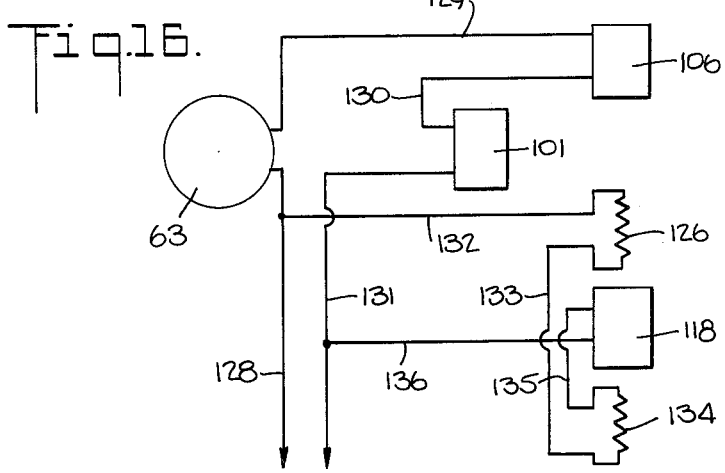

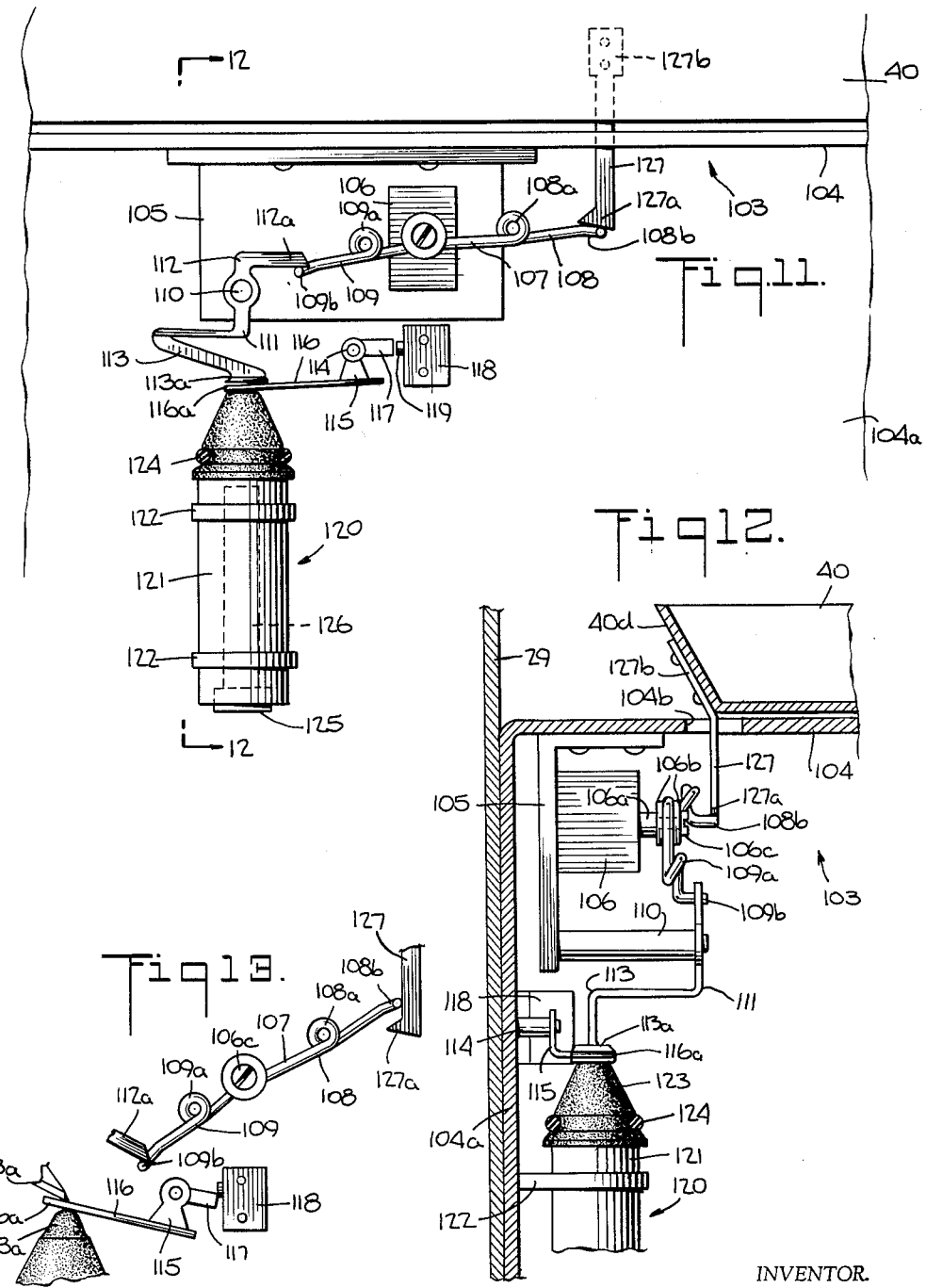

United States Patent Office 3,206,940
Patented Sept. 21, 1965

3,206,940
AUTOMATIC ICE CUBE MAKING APPARATUS
Erling B. Archer, 33—74 191st St., Flushing, N.Y.
Filed Oct. 22, 1963, Ser. No. 317,887
15 Claims. (Cl. 62—135)

This invention relates to automatic ice cube making apparatus, especially of the type which may be incorporated in household refrigerators.

More specifically, the present invention relates to improvements in automatic ice cube making apparatus and devices of the types disclosed in my prior copending applications Serial Nos. 244,830 and 245,364, both filed Dec. 14, 1962, and in my U.S. Patent No. 3,048,986, issued Aug. 14, 1962.

It is an object of the present invention to provide automatic ice cube making apparatus relatively simple in construction and highly efficient in operation.

It is another object of the present invention to provide, in and for such automatic ice cube making apparatus, means for accelerating the freezing of the water in the ice cube tray or mold and means for ejecting the cubes from the tray in a completely dry condition and without the prior use of heat for loosening the cubes from the tray.

A further object of the present invention is the provision, in and for such automatic ice cube making apparatus, of an ice cube tray or mold composed of separable tray and divider grid structures, said tray or mold being mounted for angular movement as a unit, and said divider grid structure being mounted on said tray structure for angular movement relative to the latter.

It is also an object of the present invention to provide, in and for such automatic ice cube making apparatus, means for employing a small body of freezing water as the means for initiating each ice cube ejection operation of the tray or mold.

The foregoing and other objects of the present invention, as well as the structural and operational characteristics and advantages thereof, will be more fully understood from the following detailed description when read in conjunction with the accompanying drawings, in which:

FIG. 1 is a fragmentary elevational view, partly in section, of an automatic ice cube making apparatus according to one embodiment of the present invention as installed in the freezer compartment of a household refrigerator;

FIG. 2 is a top plan view of the structure shown in FIG. 1;

FIGS. 3, 4, 5 and 6 are fragmentary sectional views taken along the line 3—3 in FIG. 1 and illustrate the apparatus in varying stages of operation thereof during a freezing cycle;

FIGS. 7, 8 and 9 are detail views of the operating mechanism for the apparatus in various stages of operation thereof as seen from the left of FIG. 1;

FIG. 10 is a fragmentary illustration of means by which the mechanism of FIGS. 7 to 9 may operate a plurality of trays in tandem;

FIG. 11 is a fragmentary elevational view of a portion of the structure of a modified embodiment of the present invention;

FIG. 12 is a fragmentary sectional view taken along the line 12—12 in FIG. 11;

FIG. 13 is a fragmentary elevational view of a portion of the structure shown in FIGS. 11 and 12 in a different stage of operation;

Figure 5:
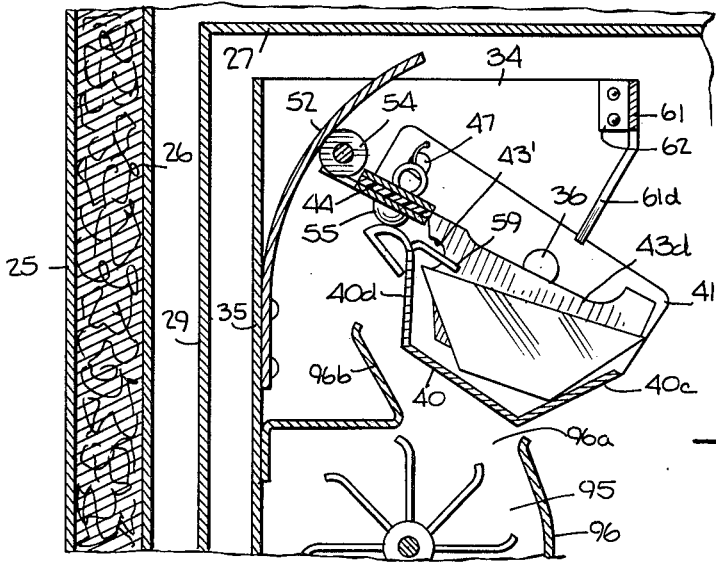
Figure 6:
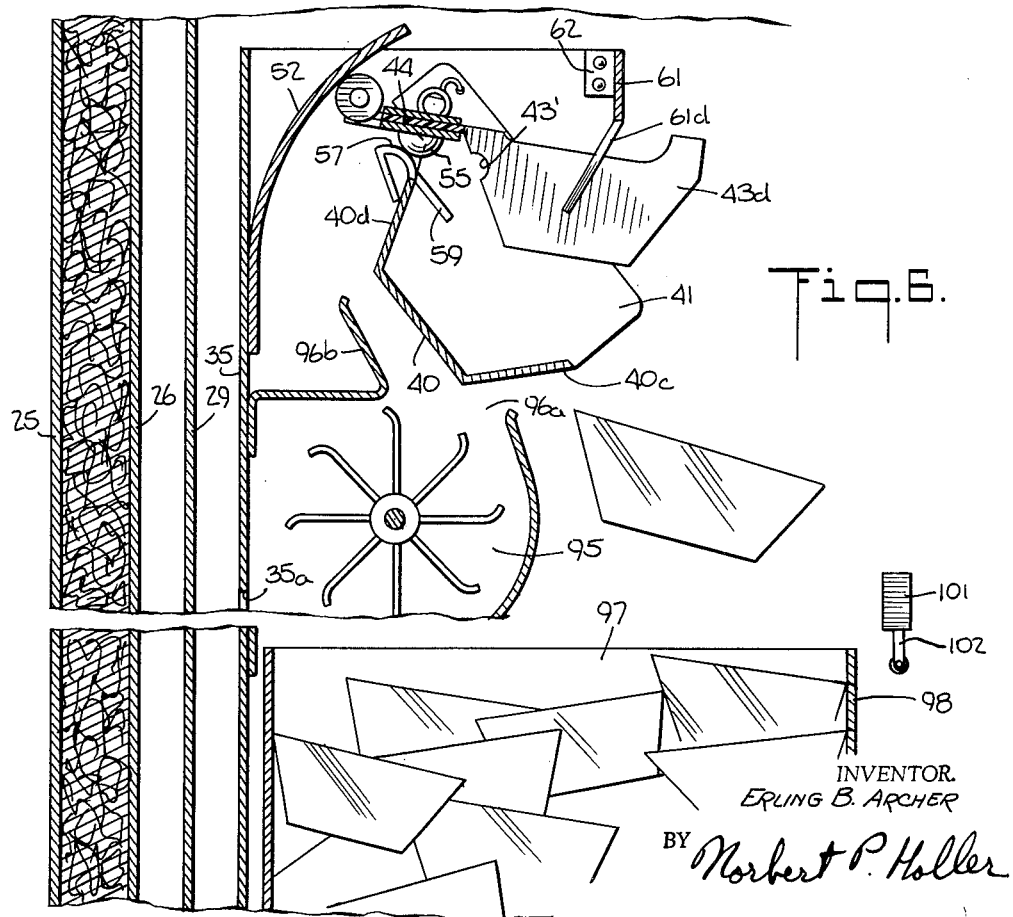

FIGS. 14 and 15 are, respectively, fragmentary sectional views, on an enlarged scale, of the ejection-initiating means of the apparatus of FIGS. 11 and 12 prior to and during an ejection operation; and FIG. 16 is a schematic wiring diagram for the apparatus of FIGS. 11 and 12.

Referring now first to FIGS. 1 to 6, the household refrigerator 20 there shown has, as usual, outer and inner top walls 21 and 22, outer and inner rear walls 23 and 24 (FIGS. 1 and 2), and outer and inner side walls 25 and 26 (FIGS. 3 to 6), the spaces between these double walls being filled with suitable insulating means well known to the art. Spaced inwardly from the inner refrigerator walls 22, 24 and 26 are corresponding top, rear and side walls 27, 28 and 29 which (together with a bottom wall, not shown) define the freezer compartment 30 of the refrigerator. The spaces between the freezer compartment walls 27 to 29 and the inner refrigerator walls 22, 24 and 26 accommodate the usual refrigerant-carrying coils 31 (see FIGS. 3 and 4) which are indicated as being located above the freezer compartment but are generally also arranged at the sides and/or the rear and/or the bottom of the freezer compartment.

The ice cube making device or unit 32 constructed in accordance with one aspect of the present invention is positioned in one of the rear corner sections of the compartment 30. The device 32 comprises a rectangular framework 33 composed of vertical front and rear walls 34 and 34a and side walls 35. Fixedly mounted in the front wall 34 of the framework 33 is a short stub shaft 36. In axial alignment therewith is arranged a hollow shaft 37 which extends through and is rotatably supported by the rear framework wall 34a, the rear freezer compartment wall 28 and the rear refrigerator walls 23 and 24 with the aid of suitable bearings 38 (only one is shown in FIGS. 1 and 2).

Positioned within the framework 33 is an ice cube mold 39. This mold comprises a slightly flexible metallic tray 40 of substantially rectangular outline as viewed from the top (see FIG. 2) and having outwardly slanted front and rear end walls 40a and 40b and side walls 40c and 40d. For the purpose of avoiding confusion, the terms "front," "rear" and "side" will be applied herein to the tray 40 and to other structural elements as the occasion arises in the same sense as to the body of the refrigerator proper, i.e. since the end wall 40a of the tray faces the refrigerator and freezer cabinet doors, it is the front wall, etc. The front and rear tray end walls 40a and 40b are extended vertically upward from the top plane of the tray, as shown at 41 and 42, but since the tray is most preferably of thin gauge sheet metal, the members 41 and 42 are strengthened or rigidified by having secured thereto respective reinforcing plate members 41a and 42a. The so-defined mounting plates 41–41a and 42–42a are provided with axially aligned holes through which the shafts 36 and 37 extend, respectively, the mounting plate 41–41a being freely rotatably supported by the shaft 36, and the mounting plate 42–42a being secured in any suitable manner to the rotatable shaft 37. These shafts thus define the major axis of angular movement of the ice mold 39 and of the tray 40 thereof in particular.

The mold 39 further comprises a pocket-defining grid structure 43 composed of a plurality of vertically parallel divider plates 43a to 43h which extend horizontally from an elongated carrier plate 44 overlying the side wall 40d of the tray 40 and the length of which is substantially coextensive with that of the tray. The divider plates may be unitary with the carrier plate 44, or they may be parts of a separate grid unit secured to the carrier plate, or they may be individually secured to the carrier plate. Both the latter and the divider plates may be made of metal, with the plate 44 being relatively rigid, or the divider plates (and if desired also the carrier plate) may be made of suitable synthetic resins or like plastic materials having the requisite strength characteristics. The connection between the divider plates and the carrier plate must be relatively resilient in nature, however, so that the divider plates 43a to 43h are readily laterally deflectible out of their normal rest positions.

Fixed to the carrier plate 44 at its front and rear ends are two short pivot pins or shafts 45 and 46 which extend through respective slanted slot-like openings 47 (see FIGS. 3, 4 and 5) provided in the end regions of the respective tray mounting plates 41 and 42. The entire grid structure 43 is thus mounted on the tray for angular movement relative thereto as well as for a limited amount of relative linear displacement. Torsion springs 48 and 49 associated with the shafts 45 and 46 and bearing against the plates 41 and 42 bias the carrier plate 44 in such a direction as to normally retain the divider plates 43a to 43h within the confines of the tray 40 so as to define the water-receiving and ice cube forming pockets 50. The various pockets 50 are generally square or rectangular in vertical cross section as seen from either side of the tray (see FIG. 1) except for the two pockets at the opposite ends of the tray which are somewhat trapezoidal in cross section due to the provision of the outwardly slanted front and rear end walls 40a and 40b on the tray 40. The two end divider plates 43a and 43h which define the inner boundaries of these two pockets are provided with small horizontal lugs or shelves 51 extending toward the adjacent tray end walls 40a and 40b.

Rigidly secured to the side wall 35 of the mold-supporting framework 33 adjacent the carrier plate 44 of the divider grid structure is an upwardly extending curved rigid abutment plate 52. The plate 44 at the edge thereof adjacent the curved plate 52 is provided with a pair of recesses 53 within the confines of which are rotatably journaled a pair of rollers 54. The outer peripheries of these rollers project somewhat beyond the said edge of the plate 44 so as to be able to come into engagement with the abutment plate 52 when the ice mold 39 has been rotated to a predetermined extent about its axis 36–37. It will be readily understood that in lieu of a single plate as shown, the abutment means may be constituted by two separate bars each about as wide as the roller which is to bear thereagainst.

The carrier plate 44 on its underside is further provided with a pair of downwardly extending dome-shaped projections 55 and 56 of which the former is slightly larger than the latter. Extending from the side wall 40d of the tray 40 are two rigid lugs or arms 57 and 58 which are disposed in alignment with the projections 55 and 56 and are adapted to engage the latter upon relative angular movement between the divider structure 43 and tray 40. The latter is further provided with a plurality of fingers 59 which extend horizontally inwardly from the side wall 40d over the respective pockets 50 defined between the various divider plates.

In accordance with the present invention, special ejector means 60 are provided to ensure that at the end of the ice cube forming part of each cycle all the cubes are fully ejected and cleared from the grid structure 43. As clearly shown in FIG. 1, the ejector means 60 comprises an elongated bracket 61 rigidly connected at 62 (see FIGS. 3 to 6) to the front and rear walls 34 and 34a of the tray-supporting framework 33 so as to extend lengthwise over the tray 40. Depending downwardly from the bracket 61 is a plurality of fingers 61a to 61i of progressively greater length. Each of the fingers 61b to 61h is provided with one curved edge, the arrangement being such that when the divider grid structure moves upwardly relative to the tray 40, the said curved edges of the fingers 61b to 61h come into engagement with the respective underlying divider plates 43b to 43h so as to cause the latter to be slightly deflected over to one side. The fingers 61a and 61i which overlie the two end pockets of the tray are not provided with such curved edges, for reasons which will presently become clear, but the finger 61a may be so shaped also if desired.

Referring now to FIGS. 1 and 2 in conjunction with FIGS. 7, 8 and 9, it will be seen that the outer rear wall 23 of the refrigerator 20 exteriorly of the latter supports, by means of suitable rigid brackets or the like (not shown), an electric motor 63 having an output shaft 64. Suitably fixed to the shaft 64 is a pulley 65 which is connected by means of a drive belt 66 to a pulley 67 secured to a shaft 68 extending into a gear train housing 69 also rigidly supported by the wall 23 exteriorly of the refrigerator. The gear train (not shown) drives an output shaft 70 to which is secured a relatively large spur gear 71. The gear 71 carries a radially projecting finger 72 and meshes with a relatively smaller spur gear 73 rotatably mounted on a shaft 74 extending from the refrigerator wall 23.

The gear 73, which is provided with a small pin or like projection 75 extending perpendicularly to the plane of the gear adjacent the periphery thereof, is mutilated, i.e. devoid of teeth, along a predetermined section 73a of its periphery. Fixed to the gear 73 and extending radially therefrom adjacent one end of the toothless section 73a is a short arm 76 to the outermost end of which is articulated one end of an elongated lever arm 77 having a hook structure 78 at its other end. To an intermediate point of the lever arm 77 is articulated one end of an arm 79 the other end of which is fixedly secured, as by means of a curved adapter shield 80 or the like, to the hollow tray supporting axle 37.

The hollow shaft 37 houses in its interior a filling pipe or conduit 81 (see FIG. 1) which increases in diameter from the rear wall 23 of the refrigerator to its discharge end disposed at the open end of the shaft 37 overlying the rearwardmost pocket 50 of the tray. At its intake end, the conduit 81 communicates with a flexible hose 82 which in turn communicates with the outlet port 83a of a valve 83. This valve may, for example, be a needle valve or the like having a flow passageway-controlling element (not shown) which can be actuated in one sense or another by an externally mounted arm 84. As clearly shown in FIGS. 7, 8 and 9, the arm 84 is pivotally mounted at 84a and is normally biased to and retained in its valve-closing position by means of a small tension spring 85 interconnected between the arm and the valve housing.

Adjacent its other end, the arm 84 carries a pivotal three-armed extension member 86 and a small stop pin 87. The extension member 86 is normally biased so as to have a flat end surface on its arm 86a in engagement with the pin 87 by means of a small tension spring 88 interconnected between the valve-actuating arm 84 and the arm 86b of the extension member 86. The third arm 86c of the member 86 is positioned so as to be engaged by the hook end 78 of the lever arm 77 during the reciprocal movements of the latter in the course of each ice cube forming cycle, as will be more fully explained presently. The inlet port 83b of the valve 83 is connected via a conduit 89 to a suitable source of fresh water, which may be either a direct tap into a water main of the house in which the refrigerator is installed or a special water reservoir arranged in any suitable location, for example, atop or near the refrigerator.

The output shaft 64 of the motor 63 further carries a pulley 90 which is connected by means of a drive belt 91 to a pulley 92 secured to a shaft 93. The shaft 93 extends through the rear wall 23–24 of the refrigerator and is drivingly connected to the shaft 94 of a multi-bladed impeller arrangement 95 enclosed within an auxiliary housing 96 secured to the framework side wall 35 below the bottom end of the abutment plate 52. The wall 35 is provided with an opening 35a communicating with the bottom part of the housing 96, and the latter is provided in the top wall thereof with an opening 96a located just in front of a partition 96b extending upwardly from the top wall of the housing. The opening 96a lies in close proximity to the bottom of the tray 40, and the partition 96b, which may, for example, be constituted by a struck-up portion of the housing 96, extends upwardly in a direction essentially parallel to the adjacent side wall 40d of the tray, terminating a short distance below the carrier plate 44.

By virtue of this construction, the impeller arrangement 95 when being driven by the motor 63 operates to draw frigid air from the freezer compartment, and in particular from the section 30a thereof contiguous to the refrigerant coil-carrying walls 27, 28 and 29, through the opening 35a and to blow this frigid air upwardly through the opening 96a out of the housing 96. Thus, a part of the said frigid air flows against and over the bottom of the tray, while another part is guided along the space between the tray side wall 40d and the partition 96b, whence it flows through the space between the divider carrier plate 44 and the adjacent side edge of the tray over the water in the latter so as to cause an accelerated freezing of the water in the tray. It should be noted that the impeller arrangement 95 may comprise a plurality of short impeller sections, preferably disposed back to back in pairs, with each section or pair of sections being in its own housing 96 and having its own respective opening 96a and partition 96b.

The means for receiving and storing the ice cubes ejected from the mold 39 comprises a storage bin 97 which may be a fixed part of the framework 33 or may be a removable adjunct thereof. The bin 97 is provided at the top of one side with a flange 98 connected to the bin by hinges 99 and normally maintained in its upright position by light torsion springs 100 associated with the hinges 99. Juxtaposed to the flange 98 is a switch 101 having an actuating arm 102 positioned in the path of angular movement of the flange 98 so as to be engaged by the latter (see FIG. 6) whenever the flange is displaced out of its vertical position upon accumulation in the bin of an amount of ice cubes sufficient to fill the bin. The switch 101 is connected to the energization circuit of the motor 63 so as to open the circuit whenever the switch arm 102 is shifted by the flange 98, thereby to inhibit further production of ice cubes until the supply of cubes in the bin has been depleted to such an extent as to enable the flange to return to its vertical position. It will be readily appreciated that the bin may be provided with a suitable access door to enable cubes to be removed from the bin as needed. Alternatively, removal of cubes may be provided for by making the bin removable from the unit or constructing it with a slidable shelf or tray. For the sake of simplicity and clarity, these structural features have not been illustrated in the drawings.

The operation of the ice cube making unit 32 will best be understood from a description of one complete freezing cycle.

As a starting point it is assumed that the bin 97 is not filled to overflowing so that the motor 63 is operating, and that the tray 40 is in the position illustrated in FIGS. 1 and 3 with the pockets 50 filled with freshly admitted water following an immediately preceding ejection of previously frozen ice cubes. Through the intermediary of the transmission means 90–91–92, the impeller arrangement 95 is rotated at a relatively high speed by the motor 63, whereby frigid air is drawn from the coldest regions of the freezer compartment 30 through the opening 35a and blown over, under and around the ice mold 39. The water in the tray, which would ordinarily become frozen into ice cubes in a period of about one and one-half to two hours by virtue of the freezing temperature maintained in the compartment 30, is thus subjected to the additional cooling effect of the forced flow of frigid air against all sides of the tray as well as against the surface of the water itself, with the result that its rate of freezing is considerably greater.

In units of this type I have found that the freezing of the water will generally be completed in less than an hour and a quarter. In fact, where the water is drawn from a house main and thus is already fairly cold, the freezing time turns out to be approximately an hour or even less.

For average environmental and operating conditions, therefore, the characteristics of the gear train are usually set to give almost one complete rotation of the gear 71 in a time interval of about 60 to 75 minutes, and the ratio between the gears 71 and 73 is such that the latter makes one complete revolution in about 10 to 15 minutes.

During the freezing part of the cycle, the continuously rotating gear 71 is in engagement with the toothless portion 73a of the gear 73 (FIG. 7). The latter thus remains stationary, as do the arms 76, 77 and 79, whereby the tray remains in its horizontal position (FIG. 3). After the aforesaid predetermined time interval, the projecting arm 72 on the gear 71 reaches the location of the pin 75 on the still stationary gear 73. Upon continued rotation of the gear 71, therefore, the gear 73 is angularly moved in a clockwise direction, bringing its teeth into mesh with the teeth of the gear 71. The gear 73 now rotates, and as it does, the arm 76 in moving therewith causes the lever arm 77 to be displaced upwardly which simultaneously causes the arm 79 and the hollow shaft 37 to be angularly displaced in a clockwise direction about the axis of the latter. This initiates the downward tilting movement of the ice mold 39. It is to be noted that at this time the tray 40 and the divider grid structure 43 still move as a unit since they are essentially rigidly interconnected by the frozen ice cubes in the pockets 50.

After a relatively short interval, the rollers 54, which are moving upwardly with the plate 44, come into engagement with the abutment plate 52. Inasmuch as neither the tray nor the grid structure can move horizontally away from the plate 52, continued free rotation of the tray and grid structure as a unit about the axis 36–37 is inhibited. At this time, however, the lugs 57 and 58 extending from the top edge of side wall 40d of the tray 40 reach the projections 55 and 56 on the underside of the carrier plate 44 in close sequence (FIG. 4), the larger one first and then the other. Since the force tending to rotate the tray 40 is continuously being applied to the arm 79, the sequential application of pressure by the lugs 57 and 58 against the projections 55 and 56 causes a slight twisting of the body of the tray itself, the effect of which is to break the ice bond between the ice cubes and the inner surface of the tray.

As soon as this has been accomplished, relative angular movement between the tray on the one hand and the divider grid structure on the other becomes possible. Upon continued downward rotation of the tray, therefore, the divider grid structure begins first to rock counterclockwise (FIG. 5) about its axis 45–46. This occurs by virtue of the fact that the lugs 57 and 58, though exerting an upward force on the carrier plate 44 via the projections 55 and 56 at one side of the apices thereof, cannot shift the pivot pins 45 and 46 of the plate 44 along the slot-like openings 47 in the tray end mounting plates 41 and 42 due to the engagement between the rollers 54 and the abutment plate 52. At a slightly later time, however, the continued movement of the tray brings the lugs 57 and 58 to the other side of the apices of the projections 55 and 56 (FIG. 6), and the upward force on the carrier plate 44 now both rocks the same as before and shifts it linearly relative to the tray to permit the rollers 54 to roll along the abutment plate 52, until at the nadir of the tray movement the divider grid structure is essentially horizontal.

Reverting now for the moment to the operational stage illustrated in FIG. 5, as the divider grid structure 43 starts its rocking movement relative to the tray, the fingers 59 bearing against the top surfaces of the various ice cubes become effective to break the ice bonds between the cubes and those parts of the associated divider plates most adjacent the tray side wall 40d. Shortly thereafter, the uppermost edges of the divider plates 43h to 43b come sequentially into engagement with the curved edges of the fingers 61h to 61b rigidly mounted thereabove, by virtue of the fact that these fingers are of progressively decreasing length. Upon continued upward movement of the divider grid structure, therefore, the various divider plates 43h to 43b are flexed about their points of attachment to the carrier plate 44 and deflected slightly out of their normal vertical state. This causes the ice bonds between these divider plates and the respective ice cubes confined therebetween to be fully and finally broken.

As the aforesaid movement continues, the fingers 61h to 61b also come into sequential engagement with the ice cubes located in the respective spaces between adjacent divider plates and push downwardly on said cubes to eject the same from the said spaces and into the bin 97 located therebelow. This same pushing and ejection action is performed by the fingers 61i and 61a, the former beginning its pushing action at about the same time as the finger 61h or just prior thereto, and the finger 61a beginning its pushing action at about the same time as or just slightly after the finger 61b. It will be noted that the fingers 61a and 61i are not of the camming type, having no curved edges corresponding to those on the fingers 61b to 61h. At the front and rear ends of the tray, these non-camming ejector fingers function just as well, however, due to the fact that the ice cubes at the opposite ends of the divider grid structure 43 are not confined between and frozen to two opposed divider plate surfaces. This absence of two confining surfaces for the end cubes makes it advisable, however, to provide the small shelves or lugs 51 to ensure that these cubes are raised out of the tray together with the divider grid structure and do not remain in the tray when the latter separates from the former. Finally it is to be noted that this cube ejection part of the cycle progresses very slowly and evenly, so that the cubes are ejected and harvested whole, i.e. without being shattered or splintered, while the total power requirements for the ejection operation are minimized.

Referring back to FIG. 7, during the entire ejection part of the cycle just described, the arm 77 continues to move upwardly from its illustrated position, and such upward movement is not hindered by the valve arm structure since the hooked end 78 of the arm 77 upon engaging the arm 86c of the extension member 86 (FIG. 8) merely displaces the latter counterclockwise against the force of the spring 88, leaving the valve actuating arm 84 in its normal position, until the hook portion has passed the said extension arm 86c. When this has occurred, the spring 88 automatically snaps the member 86 back into its rest position with the flat surface of the arm 86a abutting against the stop pin 87 on the valve actuating arm 84.

At the completion of the ejection part of the cycle, the arms 76 and 77 are in their extended vertical position. The still rotating gear 73 now begins to move the arms 76 and 77 downwardly and thus through the intermediary of the arm 79 causes the tray 40 to begin its return angular movement to its normal horizontal position, which is accompanied by the corresponding return angular movement of the now empty divider grid structure to its normal position. As will be readily understood, by virtue of the arrangement of the arms 76, 77 and 79, these return movements are precisely the reverse of the previously described movements of these same structures during the ejection part of the cycle.

As the arm 77 moves downwardly, at approximately the time the empty tray 40 reaches the position thereof illustrated in FIG. 5, the hook 78 engages the extension arm 86c from above (FIG. 9). Since the arm 86a of the member 86 is pressed against the pin 87, the said member and the valve arm 84 constitute a rigid unit, whereby the valve arm is pulled down against the force of the spring 85 to open the valve and permit water to flow from conduit 89 through conduit 82 into conduit 81 and thence into the tray 40. In the latter, the water is distributed over its entire length since at this time the divider plates are not yet fully at the bottom of the tray, but in any case each of the divider plates is provided along one edge with a small opening 43', which openings permit flow of water from one pocket to the next even when the divider plates are fully nested in the tray.

The speed of this movement of the arm 77 is such that when the arm 79 is almost back in its horizontal position and the arm 76 almost in its vertical position, the hook 78 slides past and off the extension arm 86c and permits the valve arm 84 to return to its rest position under the force of the spring 85, closing the valve and inhibiting further flow of water into the tray.

As soon as the arms 76 and 77 again reach their overlying vertically aligned positions illustrated in FIG. 7, the last tooth of the gear 73 between the pin 75 and the adjacent end of the toothless portion 73a disengages from the teeth of the gear 71. At this point, the said toothless portion 73a is again positioned in full at the path of movement of the teeth of the gear 71. The gear 73 thus comes to a halt to stop the tray movement and permit the freezing of the water in the tray as hereinbefore described. Thereafter, when the gear 71 has again almost completed its full rotation and the arm 72 again engages the pin 75, the next ejection cycle will be initiated.

It should be noted that the use of the flaring pipe or conduit 81 as the water inlet duct is an important and advantageous feature of the present invention in that it provides a downwardly slanted surface along which the water being admitted into the tray can flow. Thus, when the valve is closed, such water as in then in the conduit 81 will continue to flow downwardly into the tray and will not accumulate in the conduit where it would be frozen during the ensuing freezing part of the cycle. Thus, a continued and repeated build-up of frozen water in the conduit 81 during successive ice cube making cycles is effectively inhibited.

It will be understood that although the preceding description has made reference to only one tray of ice cubes, the unit 32 may be provided with a plurality of molds identical with the mold 39 and adapted to be operated jointly. This modification of the invention is indicated only diagrammatically in FIG. 10. Each tray of such a multi-mold arrangement would be rotatable with its own individual hollow shaft 37 and filling conduit 38, and to each such shaft 37 would be attached a respective arm 79 all of which would be articulated to a common operating arm 77. The latter would preferably (although not necessarily) be employed, however, to actuate an electric switch controlling the energization circuitry for an associated set of solenoid valves each controlling the flow of water into a respective tray. The various molds 39 may be disposed vertically one above the other or in horizontal alignment or in any other suitable relationship. In all other respects, the operation of such a modified arrangement would, for each individual ice mold, be the same as that hereinbefore described for the single mold. It will be readily appreciated that a multi-mold arrangement of this type, although suited for home refrigerators, may be employed most advantageously in commercial applications, for example in ice cube makers incorporated in ice cube vending machines, or by restaurants, bars, etc. or wherever the demand for ice cubes is relatively great for extending periods of time.

Referring now to FIGS. 11, 12 and 13 in particular, the ice cube making unit 103 there shown employs a tilting tray 40 and an associated divider grid structure and ice cube ejecting means identical in construction and operation, except insofar as hereinafter indicated, with the tray and grid structure of the unit 32. The principal differences between the two units are that in the unit 103 no means are provided for effecting a forced flow of cold air over the filled ice cube tray, and that the motor 63 is not run continuously but only intermittently for the ejection operation of each cycle. The gear 73 for the unit 103 is, therefore, not mutilated and neither the arm 72 nor the pin 75 is required or present. To compensate for these differences, special means are provided for enhancing the freezing of the water, while further means are provided for starting the motor when the water in the tray is frozen and for stopping the motor when the tray has been refilled and returned to its horizontal freezing position subsequent to an ejection operation. These means will now be described.

As indicated in FIGS. 11 and 12, the tray 40 of the ice cube making unit 103 is mounted directly above a horizontal metallic freezing shelf 104 rigidly secured by means of a bracket portion 104a to the adjacent side wall 29 of the freezer compartment. The shelf 104–104a, being in direct thermal transfer relationship with the wall 29 and characterized by high thermal conductivity, establishes immediately below the tray 40 a region substantially as cold as if the tray were positioned directly against a refrigerant coil-covering surface of the freezer compartment. The tray being mounted for tilting movement in the same manner as in the embodiment of FIGS. 1 to 9, there will, of course, have to be some clearance between the bottom of the tray and the shelf 104 sufficient to permit such tilting movement, but this clearance even for a flat-bottomed tray need not be very large if the bottom is relatively narrow and may be further minimized if a round-bottomed tray is employed.

Secured to the underside of the shelf 104 adjacent the mounting portion 104a thereof is a bracket 105 which supports a switch 106 having a horizontally extending rotary switch-actuating shaft 106a. Connected to the switch-actuating shaft 106a in any suitable manner is a lever 107 having two arms 108 and 109 extending in opposite directions from the shaft 106a. Merely by way of example, for the sake of simplicity the lever 107 is preferably made of relatively stiff wire looped around the shaft 106b and locked to the latter by means of washers 106b pressed together and locked against a shoulder on the shaft 106a by a screw 106c threaded into the shaft. The two lever arms are provided with loops 108a and 109a, respectively, the function of which is to render the respective arms relatively resilient or spring-like. The arm 108 of the lever 107 terminates in an angularly bent end portion 108b, while the arm 109 of the lever 107 terminates in an angularly bent end portion 109b.

Pivotally mounted on a horizontal pin 110 extending from the bracket 105 is a lever 111 having two arms 112 and 113, the end portion 112a of the arm 112 overlying the end portion 109b of the arm 109. Another horizontal pin 114 extending from the shelf mounting portion 104a pivotally supports a lever 115 having two arms 116 and 117. The arm 117 is juxtaposed to a switch 118 having an actuating button 119 and also mounted on the portion 104a of the freezing shelf 104.

Positioned below and in vertical alignment with the free end 116a of the lever arm 116 and the overlying end 113a of the lever arm 113 is a fluid expansion device 120. The device 120 comprises a relatively rigid housing 121 fixedly secured, as by straps or brackets 122, to the vertical mounting portion 104a of the shelf 104. The uppermost tapered or frusto-conical end region 121a of the housing 121 (see also FIGS. 14 and 15) is covered by an exterior, correspondingly shaped hood or cap 123 made of a suitable flexible and elastic rubber or synthetic plastic material. The cap 123 may be secured to the housing by means of an encircling strap, split washer or other similar fastening element 124. In its normal state, the portion 123a of the cap 123 which overlies the top open end of the housing 121 is substantially flat.

The housing 121 is hollow and is filled with a freezable aqueous liquid, such as a solution of alcohol, salt or like solute in water, having a freezing point below the freezing point of water. The physical make-up of this liquid, e.g. the concentration of the solution, the type of solute, etc., is so chosen with reference to the ancillary factors of the ambient freezer compartment temperature, the spacing of the housing 121 from the compartment wall 29, the nature of the material of which the housing 121 is made, and the volume of the housing 121, that the body of liquid will pass through its expansion stage and will be substantially frozen in the same period of time as the larger body of water in the tray 40 is frozen. The bottom end of the housing is closed by a suitable plug 125 or the like. The plug 125 carries an inwardly extending electric resistance heating element 126.

As further shown in FIGS. 11 and 12, a downwardly depending arm 127 having a bottom end 127a is fixedly secured at 127b to the side wall 40d of the tray 40. The arm 127 extends, when the tray is in its normal horizontal position, through an opening 104b in the freezing shelf 104. At such time, the end 127a of the arm 127 overlies and is in engagement with the end 108b of the lever arm 108.

Referring now in particular to FIG. 16, it will be seen that one terminal of the motor 63 is connected to a power line 128. The other terminal of the motor is connected by a conductor 129 to one terminal of the switch 106 the other terminal of which is connected by a conductor 130 to one terminal of the quantity-responsive switch 101 associated with the bin flange 98. The other terminal of the switch 101 is connected to the second power line 131. One terminal of the resistance heating element 126 is connected by a conductor 132 to the power line 128, and the other terminal of the heating element is connected by a conductor 133, a protecting resistor 134 and a conductor 135 to one terminal of the switch 118. The other terminal of this switch is connected by a conductor 136 to the power line 131. It will be readily understood that the conductors 132 and 133 are constituted by leads (not shown in FIG. 11) extending through the plug 125 screwed into the bottom end of the housing 121.

For the purpose of a description of the operation of this embodiment of the invention, the same starting conditions as set forth previously are assumed to exist, i.e. the water-filled tray is in a horizontal position, and the arms 76, 77 and 79 are in the positions thereof shown in FIG. 7. The gears 71 and 73 (the latter not mutilated) are stationary, however, since the motor 63 is "off." The levers 107, 111 and 115 are in the positions shown in FIGS. 11 and 12.

As the water in the tray 40 freezes, the solution in the housing 121 also freezes and expands. This expansion causes the portion 123a of the cap 123 on the housing portion 121a to be stretched and bulged upwardly as shown in FIGS. 13 and 15. The rising cap portion 123a displaces the end 116a of the lever arm 116 upwardly and therethrough displaces the end 113a of the lever arm 113 upwardly, causing the lever 111 to be rocked about its pivot axis 110. This lowers the end 112a of the lever arm 112 and causes the latter to push down on the end 109b of the lever arm 109.

The lever 107 thus is rocked counterclockwise in FIG. 11 about its pivot axis, and the consequent rotation of the shaft 106a closes the switch 106, thereby starting the motor and initiating the ejection part of the cycle. It should be noted that due to the presence of the loop 108a in the lever arm 108, the arm 127 does not impede the rocking of the lever 107, since the so-induced flexibility of the arm 108 permits the end 108b of the latter to slip past the stationary bottom end 127a of the arm 127, as indicated in FIG. 13. The switch-actuating shaft 106a can, of course, rotate only through a predetermined relatively small angle, and the flexibility of the arm 109 resulting from the presence of the loop 109a thus ensures that no undue stresses will be placed on the shaft 106a and on the switch elements should the lever 111 for some reason be rocked to a greater extent than necessary.

With the motor 63 now running, the ice cube ejection operation proceeds as previously described in connection with the embodiment of the invention illustrated in FIGS. 1 to 9. During the tilting movement of the tray 40 at this stage, the arm 127 is drawn upwardly through the opening 104b in the freezing shelf 104 until the end 127a of the arm 127 is located a considerable distance above the end 108b of the lever arm 108. Here again the flexibility of the arm 108 permits the end 127a of the arm 127 to slip easily past the stationary end 108b of the arm 108.

Reverting now for the moment to the start of the ejection part of the cycle, it will be recalled that when the liquid in the housing 121 of the actuating element 120 is expanding and freezing, the bulging of the cap portion 123a raises the end 116a of the lever arm 116. This causes the lever 115 to be rocked in a clockwise direction as seen in FIG. 11 about its axis 114 so as to cause the arm 117 to press against the actuating button 119 of the switch 118, thereby closing the latter. This completes the power circuit for the heating element 126. The latter thus begins to heat the substantially frozen liquid in the housing 121, whereby the now melting liquid begins to contract back into the housing 121 so as to permit the cap portion 123a to flatten out again.

In this connection it is to be noted that the resistor 134 may be bodily secured to the housing 121, either internally or externally thereof. The heat generated by this resistor will, therefore, aid the melting of the frozen liquid in the housing 121. Generally the heating characteristics of the element 126 and resistor 134 should be such that the required contraction of the liquid takes place in about 10 to 15 minutes, i.e. in a period about the same as the duration of the actual ice cube ejection operation. Even after the switch 118 is opened, however, the element 126 and resistor 134 will still be relatively hot and cooling slowly. The effect of this is to ensure that the refreezing of the liquid and its required expansion will again be completed at the same time as the freezing of the water in the tray.

Concurrently with the foregoing, of course, and following the completion of the ejection operation, the tray 40 returns to its horizontal water-receiving position in the same manner as previously described. During this return movement of the tray, the arm 127 again descends through the opening 104b in the shelf 104 until its bottom end 127a engages the end 108b of the switch actuating lever arm 108 from above. This occurs just short of the normal tray position. The descending arm 127 thus rocks the lever 107 in a clockwise direction as seen in FIG. 11 and causes the switch-actuating shaft 106a to be correspondingly rotated so as to open the switch 106. When the motor thereupon comes to a full stop, the tray is again fully horizontal and the entire cycle is begun and repeated again, as described.

As will be readily apparent, the unit 103 may, like the unit 32, be equipped with a plurality of ice molds each composed of a tray 40 and divider grid structure 43, in which case the joint operation of the several trays and grid structures as herein described may be effected by the multiple shaft and arm arrangement schematically represented in FIG. 10.

It will be understood that the foregoing description of preferred embodiments of the apparatus according to the present invention is for the purpose of illustration only and that the disclosed structures and structural arrangements are subject to a number of changes and variations none of which involves any departure from the spirit and scope of the present invention as defined in the appended claims.

Having thus described my invention, what I claim and desire to secure by Letters Patent is:

1. In an automatic ice cube making apparatus; a tray, means for moving said tray angularly about a predetermined axis between a substantially horizontal freezing position and a steeply inclined ejecting position, a grid structure pivotally supported by said tray for rocking movement relative thereto and having a plurality of divider plates extending transversely to said tray at spaced locations along said axis, means for biasing said grid structure relative to said tray so as to cause said divider plates to be nested within said tray when the latter is in said horizontal position, thereby to define in said tray a plurality of pockets in which water may be frozen into ice cubes, means operable during angular movement of said tray out of said horizontal position to effect a slight twisting of said tray so as to break the ice bond between the inner surface of said tray and any ice cubes therein and further operable to rock said grid structure relative to said tray so as to cause said divider plates and the ice cubes adhering thereto to be raised out of said tray, and ejector finger means juxtaposed to said pockets and operable during the rising movement of said divider plates to break the ice bonds between the same and the ice cubes adhered thereto and to eject the latter positively from said grid structure.

2. In an automatic ice cube making apparatus; a tray mounted for angular movement about a predetermined axis between a substantially horizontal freezing position and a steeply inclined ejecting position, a grid structure pivotally supported by said tray lengthwise of said axis and for rocking movement relative thereto and having a plurality of divider plates extending across said tray at spaced locations along said axis, means for biasing said grid structure relative to said tray so as to cause said divider plates normally to be nested within said tray when the same is in said horizontal position, thereby to define in said tray a plurality of pockets in which water may be frozen into ice cubes, means operable during angular movement of said tray out of said horizontal position to effect a slight twisting of said tray so as to break the ice bond between the inner surface of said tray and any ice cubes in said pockets and further operable to rock said grid structure relative to said tray so as to cause said divider plates and the ice cubes adhering thereto to be raised out of said tray, and ejector finger means rigidly mounted above said tray and operable during the rising movement of said divider plates to engage and deflect at least some of the same laterally so as to break the ice bonds between said divider plates and the ice cubes adhered thereto and to eject the ice cubes positively from said grid structure.

3. In an apparatus according to claim 2; feed pipe means for directing water into said tray, normally closed valve means controlling said feed pipe means, drive means operatively connected with said tray for effecting the angular movement thereof, and means operated by said drive means for effecting the opening of said valve means only during the return angular movement of said tray from said inclined position to said horizontal position.

4. In an apparatus according to claim 2; feed pipe means for directing water into said tray, normally closed valve means controlling said feed pipe means, continuously running electric motor means, an output gear driven by said electric motor means, a mutilated gear engaging said output gear and remaining stationary whenever the toothless portion thereof faces the teeth of said output gear, cooperable means on said gears for shifting said mutilated gear rotationally into meshing relationship with said output gear, and means operatively connected to and actuated by said mutilated gear when the same is set into rotation for effecting the angular movement of said tray from said horizontal position to said inclined position and back and for effecting the opening of said valve means only during the return angular movement of said tray from said inclined position to said horizontal position.

5. In an apparatus according to claim 2; feed pipe means for directing water into said tray, normally closed valve means controlling said feed pipe means, electric motor means, normally open switch means connected with said motor means to retain the latter in an inactive state, an actuator capsule containing a quantity of an aqueous liquid capable of expanding while freezing and arranged to freeze in the same time interval as water in said tray, means transmitting the expansion of said liquid in said capsule to said switch means for closing the latter so as to activate said electric motor means, means operatively connected to and driven by said electric motor means when the same is activated for effecting the angular movement of said tray from said horizontal position to said inclined position and back and for effecting the opening of said valve means only during the return angular movement of said tray from said inclined position to said horizontal position, and means for heating said liquid in said capsule during said movement of said tray to cause said liquid to contract again so as to permit opening of said switch means and deactivation of said electric motor means upon arrival of said tray in said horizontal position thereof.

6. In an apparatus according to claim 2; a pair of axially aligned shafts constituting the mounting means for said tray, one of said shafts being hollow, and a feed pipe accommodated within said hollow shaft for directing water into said tray, said feed pipe increasing in diameter in the direction of its discharge opening so as to present a water-conducting surface which slopes downwardly toward said tray, whereby any accumulation of water droplets in said feed pipe is inhibited.

7. In an automatic ice cube making apparatus; an elongated tray mounted at its opposite ends for angular movement about an axis parallel to the longitudinal dimension of said tray, a grid structure comprising a carrier plate rockably supported by said tray adjacent one side of the latter and a plurality of divider plates flexibly secured to said carrier plate and extending transversely to said tray at spaced locations along said axis, means for biasing said carrier plate relative to said tray so as to cause said divider plates normally to be nested within said tray and define therein a plurality of pockets in which water may be frozen into ice cubes, drive means operatively connected to said tray for reciprocally angularly moving the same between a substantially horizontal freezing position and a steeply downwardly inclined ejecting position, abutment means positioned for engagement with an adjunct of said carrier plate upon angular movement thereof with said tray out of said horizontal position to impede the movement of said carrier plate while the movement of said tray toward said inclined position tends to continue under the action of said drive means, cooperable means on said tray and carrier plate for impeding the continuing movement of said tray less adjacent one end of the latter than adjacent the other end, thereby to effect a slight twisting of said tray longitudinally to break the ice bond between the inner surface of said tray and any ice cubes in said pockets and thus to permit relative motion between said tray and carrier plate so as to cause said divider plates and any ice cubes adhering thereto to be raised out of said tray, and a plurality of ejector fingers rigidly mounted above said tray, at least some of said ejector fingers being positioned to engage the respective ones of said divider plates during the rising movement thereof and to deflect said divider plates laterally so as to break the ice bonds between the same and the ice cubes adhered thereto.

8. In an apparatus according to claim 7; said tray being made of relatively thin sheet metal having high thermal transfer characteristics and the ability to return resiliently to its normal shape upon release of the twisting force.

9. In an apparatus according to claim 7; said ejector fingers gradually decreasing in length from one end of said tray to the other so as to engage said divider plates and eject the ice cubes in a corresponding sequence.

10. In an apparatus according to claim 9; a storage bin positioned below said divider plates for receiving ejected ice cubes therefrom, and means for inhibiting the operation of said drive means in response to accumulation of more than a predetermined quantity of ice cubes in said storage bin.

11. In an apparatus according to claim 7; flared diameter feed pipe means for directing water into said tray, normally closed valve means controlling said feed pipe means, and means operated by said drive means for effecting the opening of said valve means only during the return angular movement of said tray from said inclined position to said horizontal position.

12. In an automatic ice cube making apparatus; a tray mounted for angular movement about a predetermined axis between a substantially horizontal freezing position and a steeply downwardly inclined position, a grid structure pivotally supported by said tray for rocking movement relative thereto into and out of nesting relationship therewith and having a plurality of divider plates extending transversely to said tray at spaced locations along said axis, said grid structure when in nesting relationship with said tray defining in the latter a plurality of pockets in which water may be frozen into ice cubes, means operable during angular movement of said tray out of said horizontal position thereof for breaking the ice bond between the inner surface of said tray and any ice cubes therein so as to permit an upward rocking movement of said grid structure relative to said tray, thereby to cause said divider plates and the ice cubes adhered thereto to be raised out of said tray, and a plurality of ejector fingers supported independently of said tray and each juxtaposed to a respective one of said pockets for engaging and ejecting the ice cubes from said grid structure during the rising movement of the latter out of said nesting relationship with said tray.

13. In an apparatus according to claim 12; means for accelerating the freezing of water in said tray, said accelerating means comprising means for effecting a forced flow of frigid air, drawn from the coldest regions of said freezer compartment, against said tray and the water therein.

14. In an apparatus according to claim 12; means for accelerating the freezing of water in said tray, said accelerating means comprising a metallic shelf of high thermal transfer characteristics secured to a wall of said freezer compartment in heat exchange relationship therewith and extending along the bottom of said tray in close proximity thereto.

15. In an apparatus according to claim 12; each of the two divider plates adjacent the opposite ends of said tray being provided at its bottom edge with a lug projecting laterally toward the respective adjacent end of said tray, thereby to ensure separation of the end cubes from their respective pockets when said grid structure is rocked upwardly relative to said tray.

References Cited by the Examiner

UNITED STATES PATENTS

| 2,757,519 | 8/56 | Sampson | 62—369 X |
|---|---|---|---|
| 2,808,707 | 10/57 | Chase | 62—344 X |
| 2,833,123 | 5/58 | Kennedy et al. | 62—353 X |
| 2,846,855 | 8/58 | Frei | 62—353 X |
| 2,942,435 | 6/60 | Nelson | 62—353 X |
| 2,962,876 | 12/60 | Baker et al. | 62—135 X |
| 2,994,206 | 8/61 | Shaw et al. | 62—344 X |
| 3,021,687 | 2/62 | Dawson et al. | 62—344 X |
| 3,025,685 | 3/62 | Kniffin | 62—340 |
| 3,048,986 | 8/62 | Archer | 62—369 X |

ROBERT A. O'LEARY, *Primary Examiner.*